(12) United States Patent
Right et al.

(10) Patent No.: US 7,030,766 B2
(45) Date of Patent: Apr. 18, 2006

(54) AMBIENT CONDITION DETECTOR WITH MULTI-FUNCTION TEST

(75) Inventors: Robert Right, Holmes Beach, FL (US); Hilario Costa, Myakka City, FL (US); Jan Braam, Bradenton, FL (US); Paul Schatz, Bradenton, FL (US)

(73) Assignee: Edwards Systems Technology, Inc., Cheshire, CT (US)

( * ) Notice: Subject to any disclaimer, the term of this patent is extended or adjusted under 35 U.S.C. 154(b) by 0 days.

(21) Appl. No.: 10/463,515

(22) Filed: Jun. 18, 2003

(65) Prior Publication Data

US 2004/0257235 A1    Dec. 23, 2004

(51) Int. Cl.
*G08B 17/12* (2006.01)

(52) U.S. Cl. ............ 340/577; 340/628; 340/629; 340/607; 340/584; 340/630; 340/632; 340/514

(58) Field of Classification Search ............ 340/577, 340/628, 607, 584, 629, 630, 514, 632
See application file for complete search history.

(56) References Cited

U.S. PATENT DOCUMENTS

| | | | | |
|---|---|---|---|---|
| 4,702,412 A | * | 10/1987 | Zelczer et al. | 236/46 R |
| 5,898,369 A | * | 4/1999 | Godwin | 340/539.26 |
| 5,905,438 A | * | 5/1999 | Weiss et al. | 340/636.1 |
| 5,960,381 A | * | 9/1999 | Singers et al. | 702/183 |
| 6,239,697 B1 | * | 5/2001 | Murao | 340/506 |
| 6,313,744 B1 | * | 11/2001 | Capowski et al. | 340/514 |
| 6,426,703 B1 | * | 7/2002 | Johnston et al. | 340/628 |

\* cited by examiner

*Primary Examiner*—Thomas J. Mullen, Jr.
*Assistant Examiner*—Tai T. Nguyen
(74) *Attorney, Agent, or Firm*—Baker & Hostetler LLP

(57) ABSTRACT

A device with a multi-function test feature for assessing or directing multiple sensor functions is provided for monitoring and interrogating air flow through Heating/Ventilation/Air-conditioning (HVAC)-type ducts for changes to ambient conditions such as smoke, heat, gas, and/or relative humidity.

28 Claims, 4 Drawing Sheets

AMBIENT CONDITION DETECTOR WITH MULTI-FUNCTION TEST

FIELD OF THE INVENTION

The present invention relates to the field of detecting changes to ambient conditions, for example by monitoring and assessing air flow conditions through Heating/Ventilation/Air-conditioning (HVAC)-type ducts and providing alarm indication when ambient conditions are compromised. More particularly, the present invention relates to a device with test features for assessing or directing sensor functions.

BACKGROUND OF THE INVENTION

Ambient condition detectors have been found to be useful in providing an indication of the presence or absence of the respective condition being detected. Smoke, gas, temperature, and relative humidity detectors, for example, have been found useful in providing early warnings of the presence of conditions such as, for example, mechanical malfunction and/or fire.

When used in Heating/Ventilation/Air-conditioning (HVAC) duct systems, ambient condition detectors are able to not only signal the presence of alarm conditions anywhere in the building, but also in the machinery of the HVAC ducts themselves. Generally, HVAC detectors have special requirements over conventional detectors. For example, HVAC detectors often sample airflow behind dust filters, which are required to prevent dirt or dust related false alarms. When clean, these filters serve to remove undesirable dust particles from activating the alarm, while still allowing a steady rate of air to flow through the detection mechanism. However, dust filters become clogged over time, compromising sensor function and necessitating periodic maintenance of the filter in addition to the operational checks of, for example, the power supply and detector operation.

Furthermore, HVAC detectors and sensors, particularly in industrial buildings, are often installed in remote locations and thus can be difficult to precisely locate when installed behind walls or within ducts, for example. Access to and disassembly of an installed smoke detector for mere checking the contamination level of a filter or activity of a sensor, for example, is undesirably cumbersome, undesirable, and uneconomical.

Therefore, there continues to be a need for an apparatus and method to test the functionality of a detector without necessary disassembly of an installed detector. It is also desirable to provide a means to test multiple functional parameters of a sensor with a single test feature that can optionally be actuated without necessary direct access to the detector.

SUMMARY OF THE INVENTION

The foregoing needs are met, at least in part, by the present invention wherein a device is provided with a switch that can perform multiple testing functions. The multi-test switch may be employed alone in an individual sensor of a ambient condition detector, or alone in a control unit coupled to multiple sensors, or in combination, with a respective switch being present on both the individual sensors and the control unit.

In one embodiment, a detector for detecting a condition is provided, comprising a first sensor that determines the presence of a first condition and provides a first alarm signal, a switch with a first engaged position for activating a first activity and a second engaged position for activating a second activity; and a control unit comprising a processor coupled to the sensor that provides a status message indicative of the state of the first alarm signal. In some embodiments, the detector may also comprise a second sensor to determine the presence of a second condition and provide a second alarm signal. The first sensor may be a photoelectric smoke sensor or an ionization-type smoke sensor. The first activity engaged by the switch may be an alarm test. In those embodiments wherein the sensor comprises an air filter, a filter test may also be engaged by the multi-test switch.

In other embodiments, the detector may comprise an air flow sensor and a processor to compare the air flow to a low air flow threshold, the processor providing an air flow alarm signal indicative of low air flow status when the air flow status is less than the low air flow threshold. The air flow threshold may be adjustable and/or set to ambient air flow.

In yet other embodiments, the detector may have a temperature sensor and a processor to compare the temperature to a high temperature threshold, the processor providing a temperature alarm signal indicative of high temperature when the temperature is greater than the temperature threshold. The temperature threshold may be adjustable and/or set to ambient air flow.

In yet still other embodiments, the detector may have a $CO_2$ sensor and a processor to compare the sensed $CO_2$ to a high $CO_2$ threshold, the processor providing a $CO_2$ alarm signal indicative of high $CO_2$ when the $CO_2$ present is greater than the $CO_2$ threshold. The $CO_2$ threshold may be adjustable and/or set to ambient air flow.

In yet still other embodiments, the detection device may comprise a second smoke sensor or a relative humidity sensor.

In other embodiments, a device is provided for detecting a condition, comprising a sensor that determines the presence of a condition and provides an alarm signal; a switch with a first engaged position for activating a first activity and a second engaged position for activating a second activity; and a processor for providing a status message indicative of the state of the alarm signal.

In other embodiments a device is provided for detecting a dangerous condition, comprising a first sensing means for determining a first ambient condition and for providing a first alarm signal, a switching means with a first engaged position for activating a first activity and a second engaged position for activating a second activity; and control means comprising a processing means coupled to the sensing means for providing a status message indicative of the state of the first alarm signal. The sensing means may be a photoelectric smoke sensor or an ionization smoke sensor in some embodiments.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
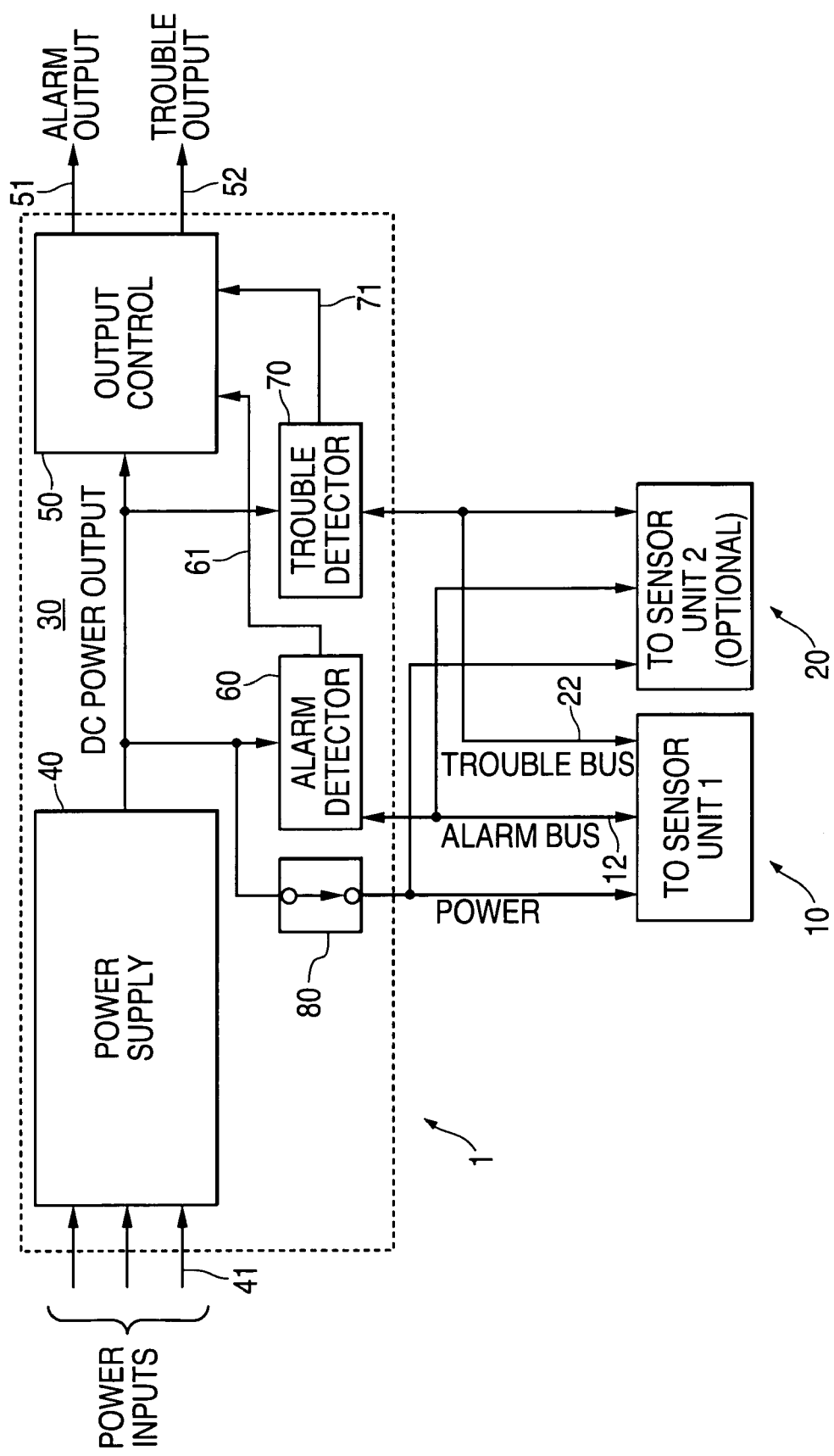
FIG. 1 is a block diagram of a power supply and control unit, including an alarm detector and a trouble detector.

While this invention is susceptible of embodiment in many different forms, there are shown in the drawing figures and will be described herein in detail specific embodiments thereof with the understanding that the present disclosure is to be considered as an exemplification of the principles of the invention and is not intended to limit the invention to the specific embodiments illustrated.

The multi-test switch feature described herein can be used with a single sensor unit, or on a control unit of a detection system that is coupled to multiple individual sensors. Alternatively, multi-test switches of the present invention may also be installed in both the individual sensors and a control unit in combination. Switches of the present invention need not be limited to any particular sensor or detector. In fact, many types of ambient condition sensors are known in the art such as, for example, smoke, gas, temperature, and relative humidity detectors, and can be used in embodiments of the invention. In embodiments where smoke detectors are used, the sensors are preferably ionization-type or photoelectric. Switches described herein can be adapted for all known detectors in the art from the teachings described herein.

FIG. 1 illustrates one embodiment of the instant invention wherein the ambient condition detector 1 comprises multiple sensors 10 and 20 that are operationally coupled to a control unit 30. Additional sensors may be integrated as desired with control unit 30. The control unit 30 may comprise both a power supply 40 and an output control 50 as shown. Alternatively, in other embodiments, the power supply 40 may be coupled to the control unit 30 peripherally (not shown). In any case, the power supply 40 is powered by a power input 41. A variety of power inputs 41 to power the power supply 40 are available and can be used, including 120V AC, 220V AC, and 24V AC/DC, and the power supply 40 may be equipped to receive the any one or all of the mentioned power inputs. The power supply 40 may power the control unit 30 and the sensors 10 and 20, or alternatively, the sensors 10 and 20 may be independently powered. The power supply 40 transmits power through the power output bus 42. The power output bus 42 may serve to power multiple devices within the detector 1, including the output control 50, the detectors 60 and 70, and the individual sensors 10 and 20, as is shown. The power output bus 42 may range from 12V to 24V DC, and preferably is 18V DC in some embodiments.

The power output bus 42 is coupled to the individual sensors 10 and 20 by means of a switch 80. When in the "on" position, the switch 80 directs power from the power supply 40 to the sensors 10 and 20 via power output bus 42. When the switch 80 is activated to the "off" position, however, transmission of power is interrupted to the sensors 10 and 20. In the embodiment shown, activation of the switch 80 only terminates power to the sensors 10 and 20, but not to the other devices, the output control 50, the alarm detector 60, and the trouble detector 70. It will be understood from the description herein, however, that the switch 80 may be incorporated in other locations to operationally supply or interrupt power to any one or all of the devices.

Many known switching means are known to those skilled in the art and may be employed for the switch 80. Preferably, in some embodiments, the switch 80 will be a multi-test switch. That is, one switch will embody multiple functions. As will be detailed below, switches of this invention will preferably have multiple engagable positions such that in one engaged position, the switch may signal one function or test, whereas in other engaged positions, the switch may signal a second function or test. In other embodiments, the switch may embody yet another engaged position so to signal yet a third function or test. In some embodiments, the switch may preferably be a single button, whereby multiple engaged positions may be indicated by the length of time the button remains depressed.

Turning to the coupling of the sensors 10 and 20 to the control unit 30 now, each sensor 10 and 20 is coupled to the control unit 30 of the detector 1 and may individually relay both an alarm signal and a trouble signal. The alarm sensor signal and trouble sensor signal from each of the sensors 10 and 20 are relayed via an alarm bus 12 and a trouble bus 22, respectively. Information from the alarm bus 12 is synthesized in the alarm detector 60 and the alarm detector signal 61 is relayed to the output control 50. Similarly, information from the trouble bus 22 is synthesized in the trouble detector 70 and the trouble detector signal 71 is relayed to the output control 50. The output control 50 contains a microprocessor to evaluate and interpret the alarm detector signal 61 and the trouble detector signal 71.

The control unit 30 assesses these signals along with other conditions such as power of the power source, and when a trouble condition is present, the control unit 30 sends a status message via the outputs 51 and 52. The outputs 51 and 52 may be transmitted though any of multiple transmission methods, including radio frequency, electronic transmission, and/or fiber optics, and may optionally include an audio signal.

In the embodiment shown in FIG. 1, the alarm detector 60 and the trouble detector 70 are individually coupled to the output control 50. As shown, the alarm detector 60 and the trouble detector 70, along with the switch 80 and the output control 50 are all installed as part of control unit 30. However, each of the aforementioned devices may be installed peripheral to the control unit 30, and not be encompassed in a single unit therein.

Figure 2:
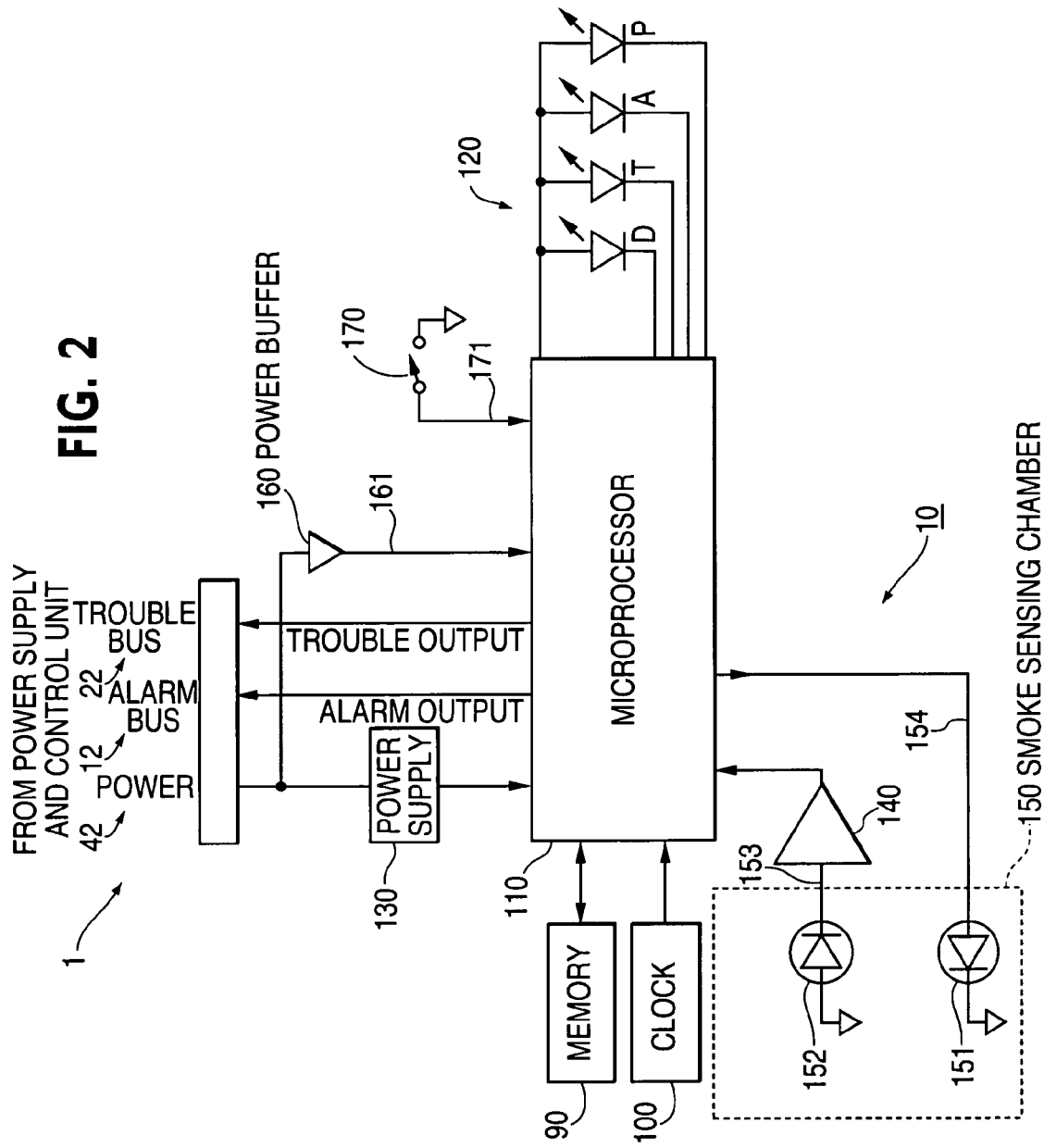
FIG. 2 is a block diagram of a sensor.

FIG. 2 shows a detail of the sensor unit 10 of the detector 1 in one embodiment of the instant invention. As mentioned above, one of ordinary skill in the art will appreciate from the teachings herein that the sensor may also be a stand-alone unit without the need for a separate control unit as shown in FIG. 2. Such embodiments are within the scope of the instant invention. Also in the embodiment shown, the sensor 10 is a smoke sensor; however, as mentioned, the sensors of this invention are not limited to smoke sensors.

The sensor 10 includes a memory 90, a clock 100, a microprocessor 110, status lights 120, a power supply 130, an amplifier 140, and a smoke sensing chamber 150. The smoke sensing chamber 150 comprises an infrared (IR) light-emitting diode (LED) transmitter 151 and a photo diode receiver 152. The transmitter 151 and receiver 152 are generally positioned at 90-degree angles to one another. In the absence of smoke then, the light from transmitter 151 bypasses receiver 152. When smoke enters the chamber 150, however, the smoke particles scatter light from transmitter 151 and some amount of light is detected by receiver 152. The signal 153 from the receiver diode 152 is further amplified by the amplifier 140 en route to the microprocessor 110.

The microprocessor 110 may be calibrated to monitor changes in the signal 153 compared to a transmitter signal 154 that is relayed to IR LED transmitter 151. The microprocessor clock 100 may be integral or peripheral to microprocessor chip 110. As with the clock 100, memory 90 may also be integral or peripheral to the microprocessor chip 110. The status lights 120 may be LEDs to signal to the operator conditions such as, for example, trouble, alarm, and/or power status of the sensor 10. In some embodiments, the status lights may be replaced by or combined with an audio annunciation. Likewise, if the sensor 10 is equipped with a filter to remove large particulate matter from the air flow though the smoke sensing chamber 80, then an LED for the dirt level of the filter may also be included on the status light display 120.

The status light display 120 may be comprised of a series of LEDs. The LEDs may signal proper function or the indication of an alarm condition when visible light is present. Alternatively, the detector may be designed such that proper function or indication of alarm condition is indicated by the lack of visible light. A combination of light signaling can also be implemented. In some preferred embodiments, a single light may be used to display multiple conditions. As will be explained in more detail below, for example, a single flash of the light may indicate a first status, a double flash of light may indicate a second status, so on and so forth. The same concept may be applied to audio annunciation.

The power source, alarm output, and trouble output, are each coupled to the power bus 42, the alarm bus 12, and the trouble bus 22, respectively, and operably coupled to the microprocessor 110. The microprocessor 110 is supplied power through a power supply 130 and may be equipped with a power monitor input 161. In the event of inadvertent power failure, the power buffer 160 buffers the sudden drop in power or alternatively, buffers the sudden rise in power when power is once restored.

In some embodiments, the multiple testing features of the detectors of the instant invention are activated though intermittent cessation of power to the microprocessor. Such deliberate interruption of power by the operator is also buffered by the power buffer 160. The microprocessor 110 then "reads" the interruption in power from the power input 161 and activates the appropriate test feature and/or response.

In some embodiments, the sensors and detectors of the instant invention may be equipped with a reed switch 170. In this embodiment, instead of intermittently dropping the voltage from the outside of a cover of the detector or sensor, the reed switch 170 is turned on when a magnet is brought into proximity by an operator. Upon this turning-on of the reed switch 170, a test signal 171 is relayed to the microprocessor 110.

Here, in the above-described embodiment, in order to keep the reed switch 170 on continuously during test, the inspector must continuously hold a magnet in close proximity to the reed switch 170. Where multiple tests may be signaled though a single reed switch 170 in some embodiments, different tests may be signaled by the duration of the reed switch 170 in the "on" position. That is, the length of time the magnet is placed in proximity to the reed switch 170 will indicate the time of engagement which may also indicate the type of test desired by the operator.

In addition, in the present invention, instead of the reed switch 170 and the magnet, an optical switch, such as an LED, or a wireless switch, such as infrared rays, or radio waves may be used as the test switch. Still alternatively, a test command, such as by intermittent changes in voltage, may be transmitted from a control panel to start test thereby effecting a remote test.

The microprocessors of this invention may be equipped to determine not only the presence or absence of the condition being sensed, but also the status level of the condition being sensed relative to a baseline or threshold value. In other words, a microprocessor of a temperature sensor in some embodiments may be calibrated to not only read the temperature level, but also be able to compare the temperature to a preset threshold. Such a threshold may be adjustable or may be set to ambient temperature. As the temperature of certain buildings may be preset to rise or fall at certain set cycles, so too are microprocessors of the present invention preferably embodied to take the ambient rise and fall in temperature into account when signaling an alarm condition. The same process described above for temperature sensors may also be similarly applied to $CO_2$, smoke, and/or relative humidity sensors.

In some embodiments, an air flow sensor is also incorporated. Particularly with ambient air condition detectors where filters are placed internally to remove unwanted particulate matter from initiating false alarm signals, air flow can often become compromised when the filters get contaminated. Alternatively, where airflow is deliberately reduced at certain periods of the day, air flow through the sensor can also be reduced.

In either event, it is desirable to provide a microprocessor that is able to distinguish restrictions in air flow from air filter contamination from restrictions in air flow from preset reduction in air circulation through out the building. Many devices for detecting and comparing air flow are known and available in the art, including the use of thermistors.

One example of how a single switch may be used to activate multiple functions will now be described. Many permutations of the example given are possible and will be understood to one of ordinary skill in the art, and all such permutations are within the scope of the invention. In one embodiment, detectors of the instant invention are equipped with a multi-test button on both the control unit and on the individual sensors. Under conditions where an alarm has been activated, the button serves to reset the detector by virtue of dropping power to the sensors. The microprocessors of the sensors detect a temporary drop in voltage and shut down the alarm. The individual sensors 10 and 20 then sense whether or not the alarm condition is still present, and then reactivate the alarm or remain reset accordingly.

Figure 3:
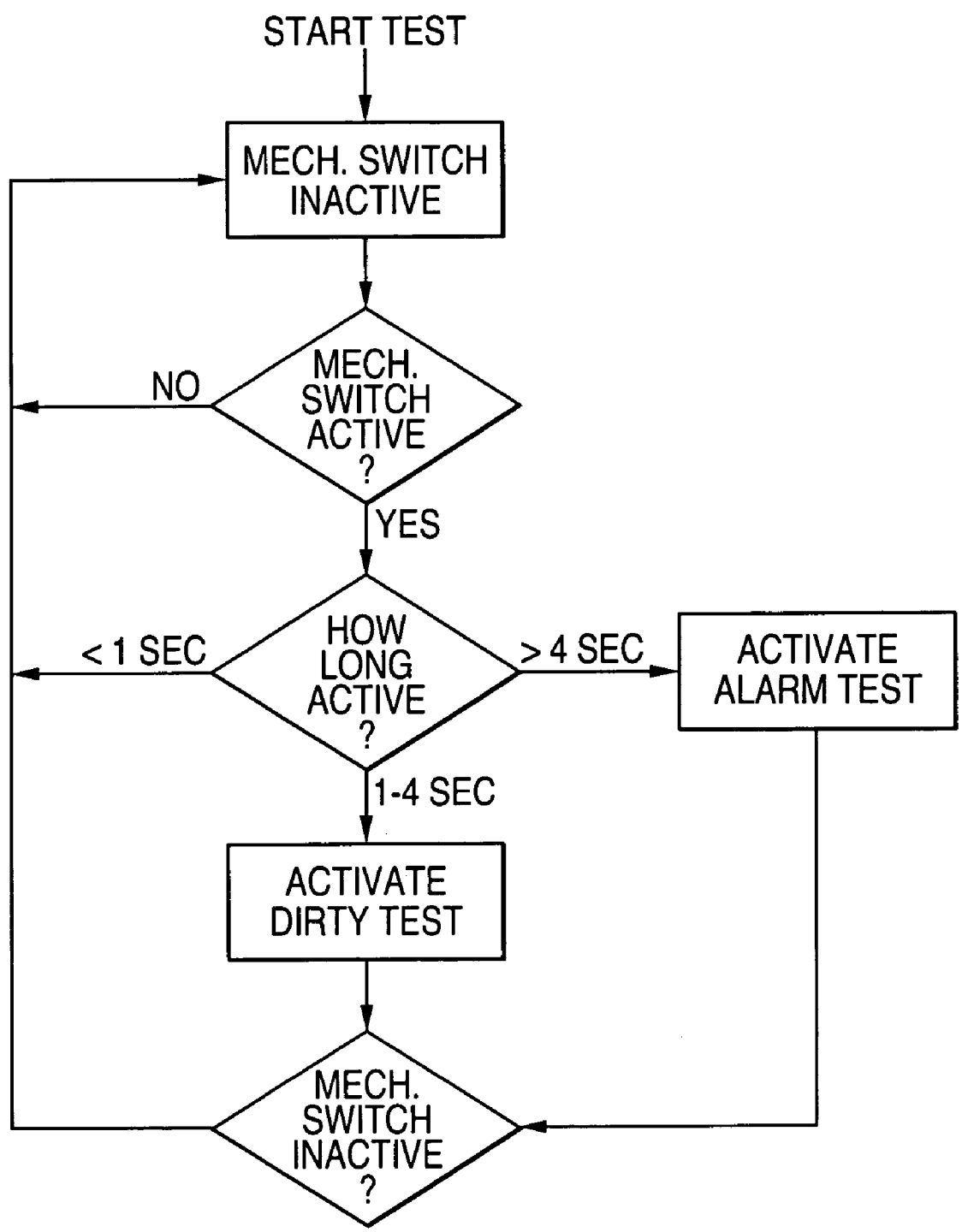
FIG. 3 is a flow chart of the logic operation of functions the detector will perform in one embodiment.

When no alarm condition is present and therefore no alarm has been activated, the same multi-test button, that functions to reset the sensors in an alarm condition, may serve as an alarm test or a test for filter contamination ("dirt test") depending on the duration the button remains depressed on the control unit or sensor. FIG. 3 shows a flow chart of the logic operation of functions the detector will perform. When the button is depressed the mechanical switch is "active". "Active" in this embodiment refers to the period of time power to the sensors is interrupted. The microprocessor 110 then assesses the length of time the switch is active. If the switch is active for less than 1 second, then no test is initiated. However, if the switch is active for 1 to 4 seconds, then the dirt test is initiated. Alternatively, if the switch is active for greater than 4 seconds, an alarm test is initiated. Upon completion of the dirt test or the alarm test, the mechanical switch is automatically reset to the inactive position.

In the embodiment described, a reed switch may also be incorporated on the individual sensors. The reed switch operationally functions similarly to the button switch on the control unit. For example, depressing the button switch is analogous to bringing a magnet into proximity to the reed switch. Moreover, depression of the button switch for 3 seconds is equivalent to holding a magnet to the reed switch for 3 seconds. Therefore, the magnet and reed switch combination can be operable in a manner similar to the button switch described above.

Figure 4:
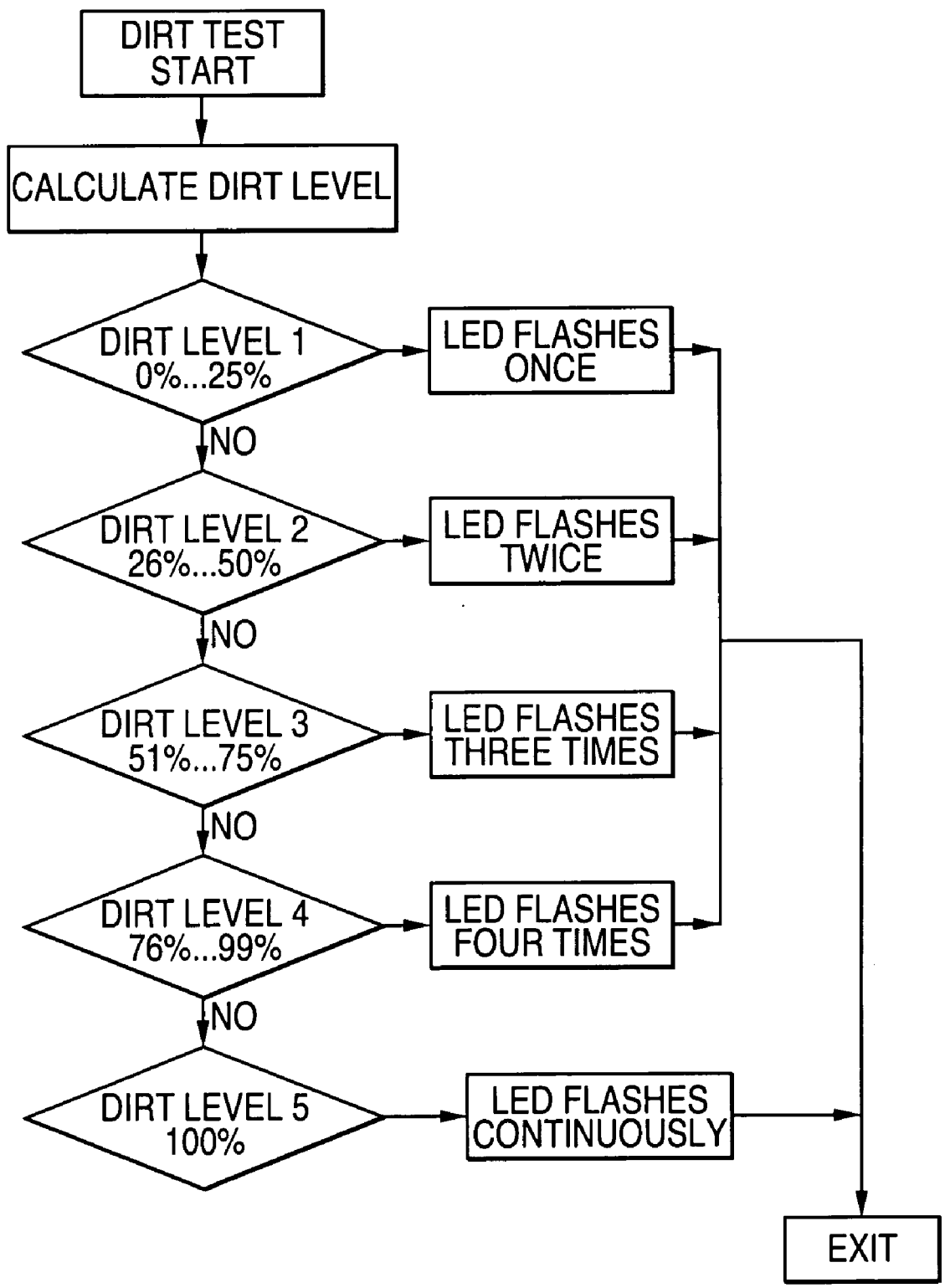
FIG. 4 is a flow chart of the logic operation of the test for filter contamination in one embodiment.

FIG. 4 shows a flow chart of the logic operation for the filter contamination ("dirt test") in one embodiment of the present invention. Once the dirt test has been activated by one of several means mentioned above (e.g., activation of the reed switch 160), the microprocessor 110 first determines the dirt level by comparing the dirt present on the filter with that present when first installed. Once a percentage of dirtiness is calculated, the processor then computes which one of five dirt levels is present. As outlined in FIG. 4 dirt level 1 is indicative of 0%–25% contamination, dirt level 2 is indicative of 26%–50% contamination, dirt level 3 is indicative of 51%–75% contamination, dirt level 4 is indicative of 76%–99% contamination, and dirt level 5 is indicative of complete (100%) contamination. Depending on the dirt level, the microprocessor 110 then transmits the appropriate signal to an LED display which flashes once, twice, thrice, four times, or continuously to indicate dirt level 1, 2, 3, 4, or 5, respectively.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A device for detecting an ambient condition, comprising:
   a first sensor that determines the presence of a first condition and provides a first alarm signal;
   a multi-test switch having a multiple engage positions with a first engaged position for activating a first activity and a second engaged position for activating a second activity; and
   a control unit comprising a processor coupled to the sensor, the control unit providing a status message indicative of the state of the first alarm signal the switch is disposed on both the control unit and on the first sensor, wherein when the switch is activated, the control unit determines a length of time the switch is active then initiates a dirty test if the switch is active for a specified length of time and initiates an alarm test if the switch is active for greater than specified length of time.

2. A device of claim 1, further comprising a second sensor to determine the presence of a second condition, the second sensor providing a second alarm signal, wherein a second engage position is disposed on said second sensor.

3. A device of claim 2, wherein the first sensor is a photoelectric smoke sensor.

4. A device of claim 3, wherein the second sensor is a smoke sensor.

5. A device of claim 1, wherein the first sensor is an ionization-type smoke sensor.

6. A device of claim 1, wherein the first sensor further comprises an air filter.

7. A device of claim 6, wherein the first activity engaged by the switch is an air filter contamination test.

8. A device of claim 1, wherein the first sensor comprises an air flow sensor to determine air flow through the first sensor, the air flow sensor providing an air flow alarm signal.

9. A device of claim 8, wherein the first sensor further comprises a processor to compare the air flow to a low air flow threshold, the processor providing an air flow alarm signal indicative of low air flow status when the air flow status is less than the low air flow threshold.

10. A device of claim 9, wherein the low air flow threshold is adjustable.

11. A device of claim 1, wherein the first sensor is a temperature sensor that determines a temperature level in the first sensor and provides a temperature alarm signal.

12. A device of claim 11, wherein the temperature sensor further comprises a processor to compare the temperature level to a high temperature threshold, the processor providing a temperature alarm signal indicative of a high temperature level when the temperature level is higher than the high temperature threshold.

13. A device of claim 12, wherein the high temperature threshold is adjustable.

14. A device of claim 1, wherein the first sensor is a $CO_2$ sensor to determine $CO_2$ level in the first sensor, the $CO_2$ sensor providing a $CO_2$ alarm signal.

15. A device of claim 14, wherein the $CO_2$ sensor further comprises a processor to compare the $CO_2$ level to a high $CO_2$ threshold, the processor providing a $CO_2$ alarm signal indicative of a high $CO_2$ level when the $CO_2$ level is higher than the high $CO_2$ threshold.

16. A device of claim 15, wherein the high $CO_2$ threshold is adjustable.

17. A device of claim 1, wherein the first sensor is a relative humidity sensor.

18. A device of claim 1, where at least one of the first and second sensors is configured for location in a HVAC duct.

19. A device for detecting an ambient condition, comprising:
   a sensor to determine the presence of a condition, the sensor providing an alarm signal;
   a multi-test switch having a multiple engage positions with a first engaged position for activating a first activity and a second engaged position for activating a second activity; and
   a processor that provides a status message indicative of the state of the alarm signal, wherein the switch is disposed on both the processor and on the sensor, wherein the processor determines a length of time the switch is activated then initiates a dirty test if the switch is active for a specified length of time and initiates an alarm test if the switch is active for greater than specified length of time.

20. A device of claim 19, further comprising a second sensor to determine the presence of a second condition, the second sensor providing a second alarm signal.

21. A device of claim 19, wherein the first sensor is a photoelectric smoke sensor.

22. A device of claim 19, wherein the first sensor is an ionization-type smoke sensor.

23. A device of claim 19, wherein the first sensor further comprises an air filter, the filter capable of contamination.

24. A device of claim 23, wherein the first activity engaged by the switch is an air filter contamination test.

25. A detection system for detecting ambient conditions, comprising:
   first sensing means for determining the presence of a first ambient condition and for providing a first alarm signal;
   a multi-test switch having a multiple engage positions with a first engaged position for activating a first activity and a second engaged position for activating a second activity ; and
   control means comprising a processing means coupled to the sensing means for providing a status message indicative of the state of the first alarm signal, wherein the switching means is equipped with a multi test button disposed on both the control means and the sensing means, wherein the control means is configured to determine the length of time the switching means is activated then initiates a dirty test if the switch is active for greater than specified length of time.

26. A detection system of claim 25, wherein the first sensing means is a photoelectric smoke sensor.

27. A detection system of claim 25, wherein the first sensing means is an ionization-type smoke sensor.

28. A detection system of claim 25, wherein at least one of the first and second sensing means is adapted for location in a HVAC duct.

* * * * *

UNITED STATES PATENT AND TRADEMARK OFFICE
CERTIFICATE OF CORRECTION

PATENT NO.        : 7,030,766 B2                                     Page 1 of 1
APPLICATION NO. : 10/463515
DATED             : April 18, 2006
INVENTOR(S)       : Robert Right et al.

It is certified that error appears in the above-identified patent and that said Letters Patent is hereby corrected as shown below:

Column 10

Lines 6-7, please delete "equipped with a multi test button";

Line 11, please insert --for a specified length of time and initiates an alarm test if the switch is active-- before "for greater than specified length of time".

Signed and Sealed this

Second Day of October, 2007

JON W. DUDAS
*Director of the United States Patent and Trademark Office*